(12) United States Patent
Reddy et al.

(10) Patent No.: US 7,362,461 B2
(45) Date of Patent: Apr. 22, 2008

(54) COMPUTER NETWORK AND RELATED METHODS FOR GENERATING PRINTER USAGE INFORMATION

(75) Inventors: Paul James Reddy, Auckland (NZ); Kevin Pickhardt, Pittsford, NY (US)

(73) Assignee: Pharos Systems International, Inc., East Rochester, NY (US)

( * ) Notice: Subject to any disclaimer, the term of this patent is extended or adjusted under 35 U.S.C. 154(b) by 772 days.

(21) Appl. No.: 10/470,869

(22) PCT Filed: Jan. 31, 2002

(86) PCT No.: PCT/US02/02799

§ 371 (c)(1),
(2), (4) Date: Dec. 8, 2003

(87) PCT Pub. No.: WO02/061542

PCT Pub. Date: Aug. 8, 2002

(65) Prior Publication Data

US 2004/0093410 A1   May 13, 2004

(30) Foreign Application Priority Data

Jan. 31, 2001  (NZ) ..................... 509641

(51) Int. Cl.
  *G06F 15/00* (2006.01)
(52) U.S. Cl. ................ 358/1.15; 358/1.13; 358/1.16; 399/407; 399/410; 709/203; 709/223; 709/224
(58) Field of Classification Search .............. 358/1.15, 358/1.13, 1.16; 399/407, 410; 709/203, 709/223–226
See application file for complete search history.

(56) References Cited

U.S. PATENT DOCUMENTS

| | | | | |
|---|---|---|---|---|
| 4,369,052 | A | * | 1/1983 | Hotmer ...................... 65/160 |
| 5,146,344 | A | | 9/1992 | Bennett et al. ............. 358/296 |
| 5,383,129 | A | | 1/1995 | Farrell ................... 364/464.01 |
| 5,625,757 | A | * | 4/1997 | Kageyama et al. ........ 358/1.14 |
| 5,745,883 | A | | 4/1998 | Krist et al. ................... 705/34 |
| 5,787,149 | A | | 7/1998 | Yousefi et al. ............... 379/59 |
| 5,935,262 | A | | 8/1999 | Barrett et al. ................ 714/46 |
| 5,993,088 | A | | 11/1999 | Nogay et al. ................ 400/78 |
| 6,025,925 | A | | 2/2000 | Davidson, Jr. et al. .... 358/1.15 |
| 6,052,547 | A | | 4/2000 | Cuzzo et al. ................ 399/79 |
| 6,216,113 | B1 | | 4/2001 | Aikens et al. ............... 705/34 |
| 6,243,548 | B1 | | 6/2001 | Hebert et al. ................ 399/79 |
| 6,308,205 | B1 | | 10/2001 | Carcerano et al. ......... 709/221 |
| 6,333,790 | B1 | * | 12/2001 | Kageyama ................ 358/1.15 |
| 6,348,971 | B2 | * | 2/2002 | Owa et al. ................ 358/1.15 |
| 6,665,086 | B2 | * | 12/2003 | Hull et al. ................ 358/1.15 |
| 6,927,869 | B1 | * | 8/2005 | Simpson et al. .......... 358/1.15 |
| 6,952,278 | B2 | * | 10/2005 | Miyahara et al. ......... 358/1.15 |
| 6,977,747 | B1 | * | 12/2005 | Matsukubo et al. ...... 358/1.16 |
| 6,985,245 | B1 | * | 1/2006 | Takahashi ................. 358/1.15 |
| 7,177,034 | B2 | * | 2/2007 | Nakagawa et al. ........ 358/1.14 |
| 2001/0053295 | A1 | | 12/2001 | Kujirai et al. ............... 399/79 |

* cited by examiner

*Primary Examiner*—Douglas Q. Tran
*Assistant Examiner*—Chan S. Park
(74) *Attorney, Agent, or Firm*—Allen, Dyer, Doppelt, Milbrath & Gilchrist, P.A.

(57) ABSTRACT

A computer network may include a plurality of computers connected together in a network and generating printer control data, and at least one printer connected to the network for printing the printer control data. The at least one designated computer may generate printer usage information from the printer control data.

35 Claims, 5 Drawing Sheets

COMPUTER NETWORK AND RELATED METHODS FOR GENERATING PRINTER USAGE INFORMATION

FIELD OF THE INVENTION

The present invention relates to the field of document processing, and, more particularly, to a computer network and related methods for monitoring printer resource usage.

BACKGROUND OF THE INVENTION

Despite the advances in electronic document storage in recent years, paper based documents are still required for many reasons by businesses, including readability and record maintenance. As a result, the use of printers is extensive and growing. The costs associated with printers can be significantly high, and it may therefore be extremely beneficial to many businesses to know what their printer resource usage is so that the costs associated therewith may be determined for accounting purposes. Furthermore, this information may also assist in determining how the printing requirements for a given business may best be met in the most economically efficient manner by using various network configurations or printers that are on the market.

To this end, a certain amount of print information may be obtained from the operating system on any particular individual personal computer, or on any network of computers. However, the information that may be gleaned from operating system records or logs is often limited. Although the operating system may provide information as to when a print job was requested and by whom, for example, it generally will not provide information about the attributes that were selected with the print job. Such attributes may include, for example, sorting, stapling, double-sided printing, paper size, amount of toner/ink expended, etc.

Various attempts have been made in the prior art to account for printer usage. For example, U.S. Pat. No. 6,216,113 to Aikens et al. discloses an electronic network transaction recording system for accumulating billing data for printing machines interconnected to multiple work stations on the network. A network administrator includes a memory for storing data representing usage of selected printers and a decoder for validating a print job request and a billing account number. This usage data and billing information is provided by the user via a user interface which is prompted when a user requests a print job. Requests for print jobs are verified based on the billing information and billed to an individual or group billing account number.

While the above approach does provide certain advantages, such as attributing printing charges to billing account numbers, it may be disadvantageous for tracking printer resource usage in some circumstances. For example, if one wishes to track the usage of particular printers for resource deployment purposes, it may be cumbersome to require users to type usage data and billing information into a user interface for each print request. Moreover, the above system may not account for print usage on local printers, or printing that is done remotely by users with laptop computers, for example.

SUMMARY OF THE INVENTION

It is therefore an object of the invention to provide a computer network and related methods which generate printer usage information that may be analyzed to determine a more efficient allocation of printer resources and, consequently, promote more responsible use and a better understanding of printing costs.

This and other objects, features, and advantages in accordance with the present invention are provided by a computer network which may include a plurality of computers connected together in a network and generating printer control data, and at least one printer connected to the network for printing the printer control data. The at least one designated computer may generate printer usage information therefrom. Furthermore, the at least one designated computer may copy the printer control data and generate the printer usage information from the copied printer control data, which advantageously allows the printer control data to continue to the intended printer without significant delay.

More particularly, the at least one designated computer may be at least one server. Alternately, at least one of the computers may be a server, and the at least one server may cause a tracking application to be installed on the at least one designated computer for causing the at least one designated computer to copy the printer control data and generate printer usage information therefrom. Further, the at least one server may also cause a monitoring application to be installed on the at least one designated computer to detect local printing (or this may be done manually). Thus, the at least one server may cause the tracking application to be installed on the at least one designated computer based upon the monitoring application detecting local printing. Thus, the tracking application can advantageously be installed only on those computers which perform local printing, for example, if desired.

In addition, the at least one designated computer may collect the printer usage information. The at least one server and/or the at least one collection computer may also collect the printer usage information from the designated computer. Moreover, the at least one designated computer may delete the printer usage information after collection thereof by the at least one collection computer (or the at least one server). Further, the at least one collection computer may cause a tracking application to be installed on the at least one designated computer for causing the at least one designated computer to copy the printer control data and generate printer usage information therefrom. The at least one collection computer may also periodically generate a summary of the printer usage information.

The at least one designated computer may include at least one of a personal computer (PC), a laptop, and a personal data assistant (PDA), for example. Further, the at least one designated computer may be temporarily connected to the network. That is, if the at least one designated computer is a laptop, it may still copy printer control data and generate printer usage information based thereon while it is not connected to the network. The same may also be true of a PC when it is not logged onto the computer network but is performing local printing, for example. Thus, the at least one designated computer may also generate the printer control data. Furthermore, the at least one user designated computer may delete the copied printer control data after generating the printer usage information.

The printer usage information may include at least one of a date when the printer control data was sent, a time when the printer control data was sent, an identifier of a computer generating the printer control data, a user name of a user originating the printer control data, an identifier for the at least one printer, a number of pages to be printed, and a size of the printer control data. Moreover, the printer usage information may also include job attributes including at least one of paper size, simplex printing, duplex printing, sorting, stapling, binding, color printing, document collation, tumble feeding, manual feeding, automatic feeding, and trim.

A method aspect of the invention is for generating printer usage information for a computer network comprising a plurality of computers. The method may include generating printer control data from the plurality of computers to be printed by at least one printer connected to the computer network. Furthermore, the printer control data may optionally be copied using at least one designated computer, and printer usage information may also be generated from the copied printer control data using the at least one designated computer.

The present invention also relates to a computer-readable medium having computer-executable instructions for performing steps for generating printer usage information for a computer network comprising a plurality of computers. The steps may include intercepting printer control data generated by the plurality of computers using at least one designated computer, where the printer control data is to be printed by at least one printer connected to the computer network, and generating printer usage information from the printer control data.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
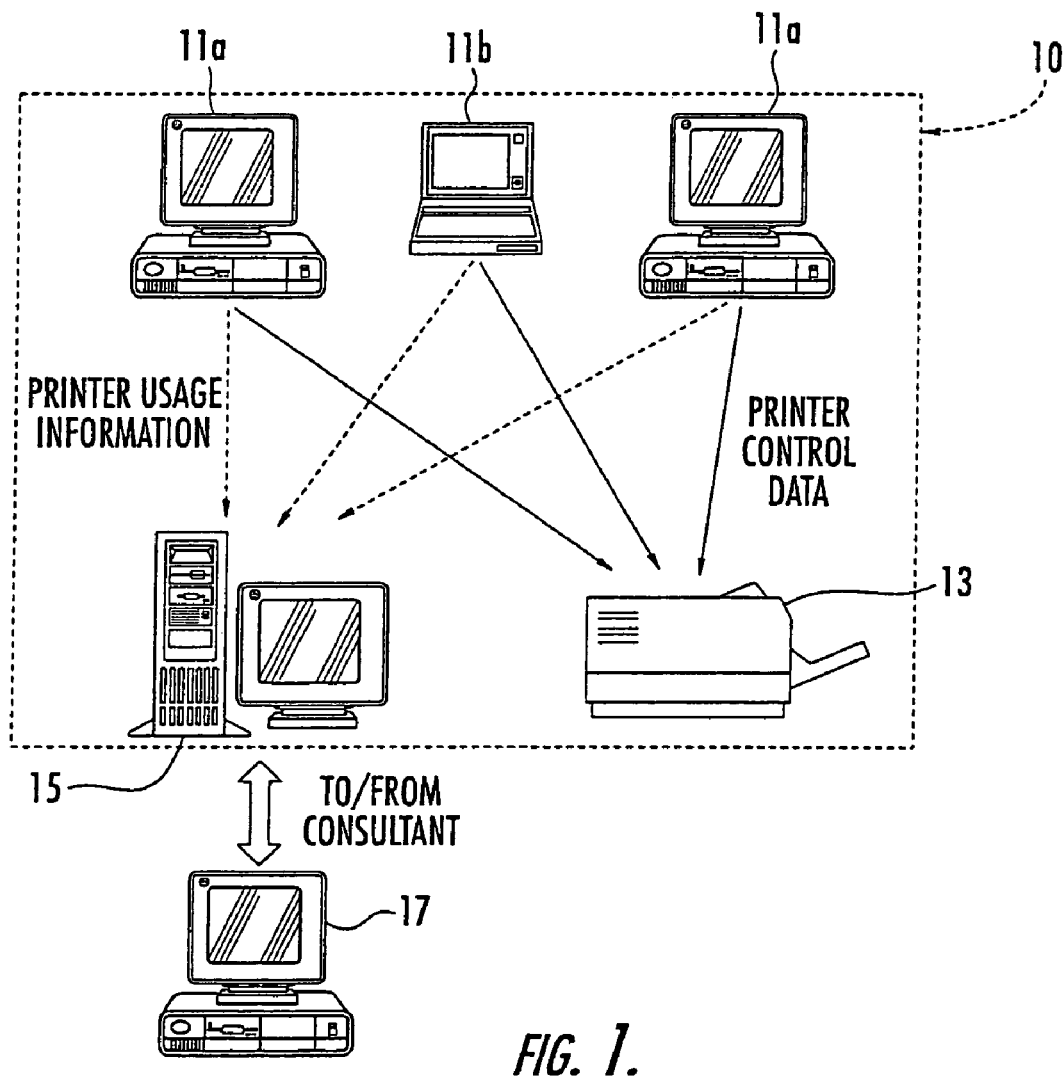
FIG. 1 is a schematic block diagram of a computer network according to the present invention for generating printer usage information.

Referring now to FIG. 1, a computer network 10 according to the present invention is first described. The computer network 10 illustratively includes one or more computers such as user computers 11 connected together. More particularly, the user computers may be personal computers (PCs) 11a and/or laptop computers 11b, for example, or any other suitable device which is capable of generating print jobs for a printer, such as personal data assistants (PDA), etc., for example, as will be understood by those of skill in the art. Furthermore, the computer network 10 may be a local area network (LAN) or any other form of network, including a virtual private network or the Internet, for example.

One or more printers 13 are also connected to the network 10. The user computers 11a, 11b typically have one or more applications installed thereon, such as a word-processing application, for example, which generate print jobs. Each print job is transmitted to the printer 13 as printer control data, as illustratively shown with solid arrows in FIG. 1, which includes the requisite instructions and/or information required by the printer to print the user's document, image, etc. By way of example, the printer control data may take the form of a print spool file, a print data stream, etc., depending upon the particular application generating the print job and/or the operating system. The application directs the printer control data to be sent via the computer network 10 to a particular printer 13 (which may be either a network printer or a local printer), via a parallel port, serial port, infrared link, USB port, etc.

As used herein, "printer" broadly includes any suitable device that can print a document, etc. from printer control data generated by a computer, such as laser printers, ink-jet printers, thermal printers, multi-function devices such as copiers that include printing capabilities, fax machines, etc., as will be understood by those skilled in the art. The computer network 10 may include wires, fiber-optic cables, and/or wireless links, for example, for connecting the various components, as well as other suitable devices which will also be appreciated by those skilled in the art.

According to the present invention, a printer control data tracker application may be installed and run on the user computers 11a, 11b to detect when an application generates printer control data. When this occurs, the printer control data sent from the user computer 11a, 11b to the printer 13 is intercepted, and optionally copied by, the printer control data tracker application. Copying the printer control data may be advantageous in that the copy can be used to generate the printer usage information, as will be explained further below, while allowing the printer control data to continue along to the printer 13, though this is not required. The tracker application then executes the printer control data (or copy thereof) to extract printer usage information (illustratively shown as dashed arrows in FIG. 1) therefrom. More particularly, the tracker application executes or renders the printer control data, much the same as a processor in the printer 13 would otherwise do to print the document, to obtain the printer usage information.

By way of example, the printer usage information may include: a page count; a date and time of printing; the user computer 11a, 11b from which the print job was generated and the user who originated the print job; a logical printer to which the printer control data was sent; a port via which the printer control data was sent; a printer driver used; whether the printer control data was printed locally (i.e., when the user computer was connected or logged on to the network 10) or remotely; a name and size of the print job; and print job attributes. The print job attributes may include, for example, paper size, simplex or duplex printing, sorting, stapling, binding, color printing, collation, tumble feeding, manual or automatic feeding, trim, etc.

The printer usage information may be written into a printer usage information file which may then be forwarded to a collection computer 15 also connected to the computer network 10, for example. It should be noted that a separate collection computer 15 may not be needed, and that a server 16' (FIG. 2) or one of the user computers 11a, 11b may collect the printer usage data in certain embodiments.

Moreover, printer usage information files may also be stored temporarily in the memory (either in RAM or on disk, for example) of the user computer 11a, 11b (or elsewhere)

rather than being sent directly to the collection computer 15. This may be advantageous when the collection computer 15 is unavailable, for example. This may also be done when the user computer 11a, 11b is temporarily disconnected from the computer network 10. According to the invention, when the user computer 11a, 11b is reconnected to the computer network 10, the print usage information file that is stored in the user computer may then advantageously be forwarded to the collector 15 so that no data is lost.

One example of disconnection and subsequent reconnection of a user computer 11a, 11b to the computer network 10 is that of a laptop which may be temporarily connected to the computer network for data synchronization purposes. Of course, this may also occur with a user PC 11a in the case of a network or server outage, or simply from not logging on to the network and printing locally, as will be appreciated by those of skill in the art.

Figure 2:
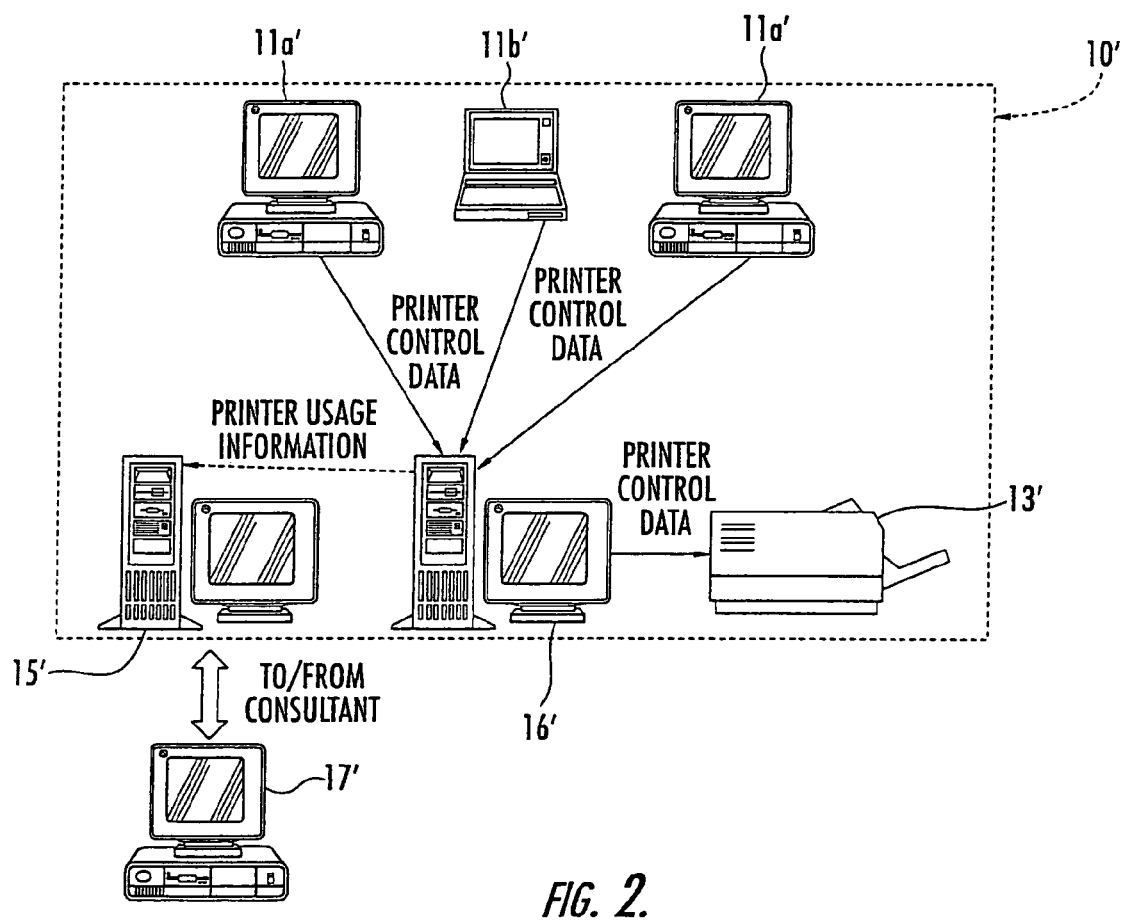
FIG. 2 is a schematic block diagram of an alternate embodiment of the computer network of FIG. 1 including a server.

Turning now to the embodiment illustrated in FIG. 2, all of the user computers 11a', 11b' are connected to the server 16' (e.g., a print server). If all of the printer control data from the user computers 11a', 11b' is directed to the network printer(s) 13' via the server 16', the above noted printer control data tracker application may advantageously be installed only on the server yet still track all of the printer resource usage for the entire computer network 10'. Of course, the printer control data tracker application may additionally be installed on the user computers 11a', 11b' as noted above, which will be discussed further below.

As similarly described above, the server 16' may generate the printer usage information file and forward it along to the collection computer 15'. Here again, the server 16' could also collect the printer usage information in some embodiments, or the server may temporarily store the printer usage information file as described above with respect to FIG. 1.

According to the present invention, printer resource usage information may be generated and collected for the computer network 10' over a predetermined period of time without users knowing that the resources are being monitored. For example, a period of about 40 days or less should be sufficient to provide an accurate sample of printer resource usage in most circumstances, though any period of time may be used. The results of an analysis of printer usage obtained according to the present invention may be particularly accurate in that actual usage of the printer resources for both local and network printers may be tracked.

To this end, if it is desired to install and operate the tracking function of the present invention in a way which is substantially "invisible" or undetectable to users, the printer control data tracker application may be installed remotely on the user computers 11a', 11b'. For example, another computer on the computer network 10' (such as from the server 16' or collection computer 15') may cause the software to be uploaded to a user computer 11a', 11b' and then cause a self-install routine take place.

In certain circumstances, some other party, such as a consultant, may perform the software installation and analyze the results to report back to the owner of the computer network 10'. Therefore, in a typical installation setup, the consultant will install the software used to implement the present invention on a consultant computer 17.

Thereafter, the consultant may install the collector software according to the invention on the appropriate collector 15' (or server 16', if the server performs the collection function). This software is designed to work with the operating system (or systems) used by the computer network 10', such as Windows NT or other suitable operating systems. The collector software, once installed, in turn configures and installs the printer control data tracker application software on the server 16' and/or user computers 11a', 11b'.

If both the server 16' and user computers 11a', 11b' have the tracking software installed thereon, there exists the possibility of double counting print jobs as the printer control data propagates through the computer network 10'. The present invention may advantageously avoid this problem by tagging each printer. spool file when it is copied by the printer control data tracker application. Therefore, before the copying occurs, a search may be performed for such a tag. If a tag exists, then analysis of the data is not performed, since this has already been done "upstream."

Installation of the counter and/or tracking software of the present invention may be performed in several ways. For example, a push install may be used in which the server 16' can "silently" push the printer control data tracker application software onto any user computers 11a', 11b' on the computer network 10'. This option may be implemented on Windows NT-based networks as well as others, for example. Additionally, an installation program may be emailed to users, along with a message telling the user to run that program. The program can either be the full installation program for the printer control data tracker application or, alternatively, a smaller executable program which, when run, downloads and runs the larger installation program from the server 16'.

Moreover, on networks where logon scripts are used, the printer control data tracker application can be installed by adding a command to execute the installer in the logon script. In addition, a manual install from a floppy disk, CD-ROM, etc., or alternatively a network share, may also be used. Other suitable methods may also be used.

It should also be noted that a relatively small local printer port monitoring program may also be similarly installed on a user computer 11a', 11b' to detect whether the user computer is printing to a local printer. If so, the local printer port monitoring program can prompt the server 16' or collection computer 15' to cause the printer control data tracker application to be installed on the particular user computer 11a', 11b'. This may advantageously reduce the need to install the printer usage tracker application on every user computer 11a', 11b', as will be appreciated by those of skill in the art.

As noted above, printer resource usage according to the present invention can occur in both online and offline situations. For the case of a laptop computer 11b', if the user is on a business trip and printing from the laptop, printer usage information may be stored locally as a file on the laptop. Then, once communication with the collection computer 15' is established or re-established via the computer network 10', this printer usage information will be sent to the collector and purged from the user computer 11b'.

The same may also be the case for a PC 11a' if it is temporarily disconnected from the computer network 10' due to network outage, etc. If required, the printer usage files can also be manually copied to the collection computer 15' and added to the appropriate database. Of course, the copied printer control data may also advantageously be deleted from the memory of the server 16' and/or user computers 11a', 11b' after the printer usage information has been generated to further conserve memory consumption.

Once the print job information is sent to the collection computer 15', it may be stored in a central location in an encrypted format. This prevents unauthorized users from analyzing the data and limits such analysis to the appropriate consultant or administrator. Such encryption can also save space and prevent the collected printer usage information from being corrupted should a user of the computer network 10 attempt to manipulate the data.

Details of the collection process may advantageously be viewed on-site by an authenticated user or administrator, for example. Alternately, and/or in addition, summaries of the collection process may be periodically generated and emailed by the collection software to the consultant's computer 17', or else manually collected by the consultant. For example, such data may be transferred as a CSV file, as will be appreciated by those of skill in the art, though any suitable data transfer method may be used. During the data collection period, other information relevant to the printer resource usage analysis and subsequent recommendations generated by the collection software may also be collected by the consultant. Such information may include, for example: the identity of all printers 13' that have print queues to be monitored and their locations relative to the user computers 11a', 11b'; the customer's special needs for secure printing; non-automated finishing options; manual finishing options and other options which are not currently available on-site; and the customer's special stationery needs.

Turning now to the analysis of the printer usage information which has been collected, as is illustratively shown in FIGS. 1 and 2, at the end of the collection period the consultant may collect the printer usage information from the collection computer 15' and load this information into his computer 17'. The consultant may then normalize the data. It is at this stage that logical printers may be matched to physical devices from the information described above, as will be appreciated by those of skill in the art.

The consultant may then inspect the printer usage information and select an appropriate time period to be used for subsequent reports. This time period may be a subset of the collection period, such as a calendar month, for example. In some circumstances it may be desirable to select a time period of more than a few days since it may take several days before the printer control data tracker application is installed on all of the requisite user computers 11a, 11b, for example. This may be the result of users being out of the office and not logging onto their machines for an extended period, for example.

The consultant preferably generates reports which include information regarding print sources and their associated volumes or workloads. The print usage information may advantageously be analyzed using existing analysis software (such as Microsoft Access or Seagate Crystal Reports, for example) to show the printing resources required at various time periods and the overall cost of these resources. Feedback may then be provided by the consultant to the customer on printer usage and configurations recommended for maximizing efficiency and minimizing costs. The recommendations may involve recommending more appropriate printers 13, or setup thereof, on the computer network 10. Of course, the printer usage information may also be analyzed on-site as well by either a consultant or an appropriate administrator.

Figure 3:
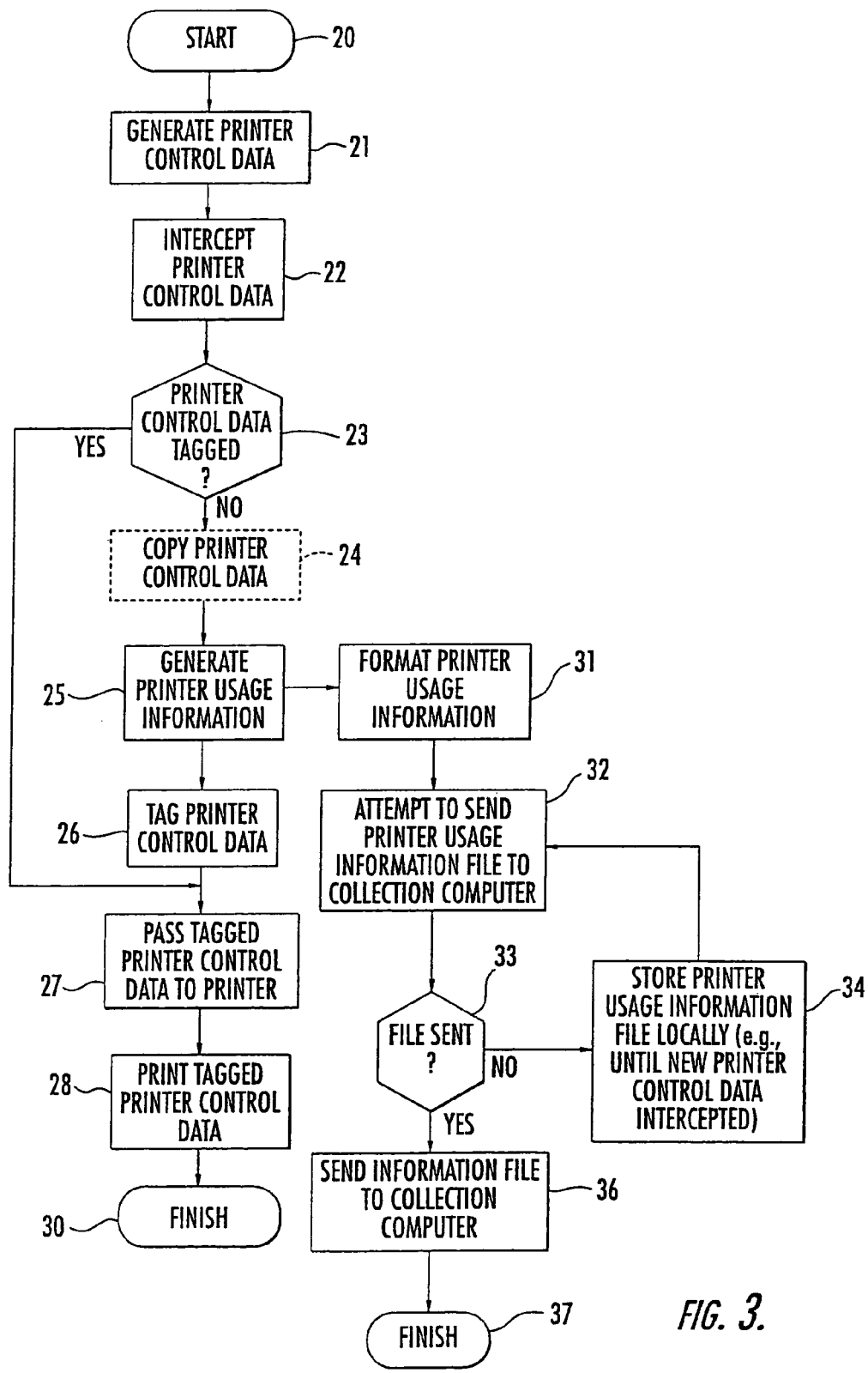
FIG. 3 is a flow diagram illustrating a method according to the present invention.

A method aspect of the invention for generating printer usage information for a computer network 10 will now be described with reference to the flow diagram of FIG. 3. The method begins (Block 20) with the generation of printer control data from the plurality of computers 11a, 11b, as described above, at Block 21. The printer control data tracking application running on the at least one designated computer may then intercept the printer control data (Block 22) and detect whether it has already been tagged, at Block 23. If so, the printer control data tracking application can pass the printer control data along for printing (Block 27) without performing an analysis to generate printer usage information (since this has previously been done), as described above.

If the printer control data has not previously been tagged, the tracking application may optionally copy the printer control data (Block 24) and generate the printer usage information therefrom (Block 25), i.e., by rendering or executing the file as described above. The printer usage information may also be tagged, at Block 26, and passed along for printing, at Block 27. Of course, while the step of generating the printer usage information (Block 25) is illustratively shown as proceding the step of tagging the printer control data (Block 26), these steps may be performed in any order. The tagged printer control data may then be printed, at Block 28, thus concluding the print process (Block 30).

The tracking application may then format the printer usage information as a particular file type (Block 31) and attempt to send the same to the collection computer 15, at Block 32. If the at least one designated computer cannot send the printer usage information file to the collection computer 15 (e.g., because either computer is logged off of the network 10), at Block 33, it may then store the printer usage information file locally (Block 34), as noted above, to be sent to the collection computer at a later time. By way of example, the printer usage information file may be stored locally until a next time printer control data is intercepted, and the steps illustrated at Blocks 32-33 repeated, as will be appreciated by those skilled in the art. On the other hand, if the at least one designated computer can send the printer usage information to the collection computer 15, then this is done (Block 36) and the data collection process is completed, at Block 37.

Figure 4:
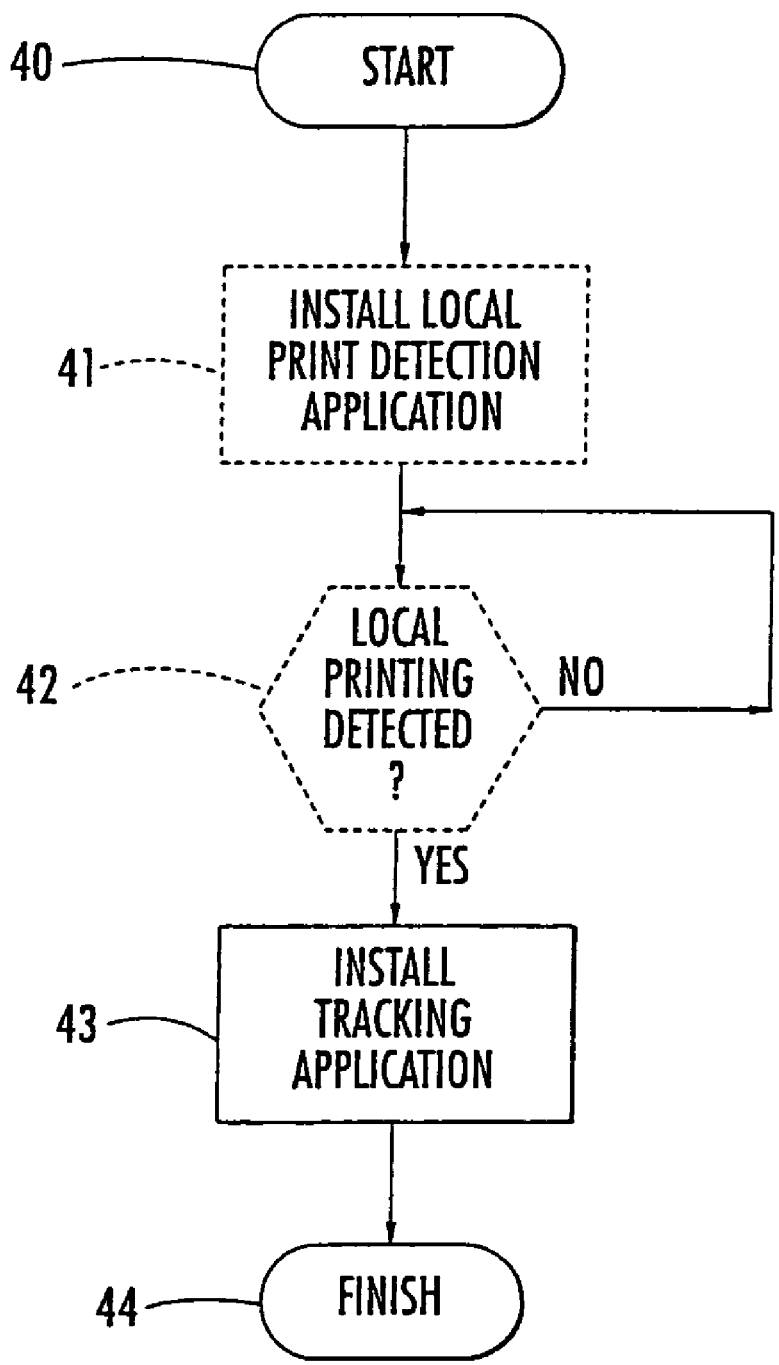
FIG. 4 is a flow diagram illustrating installation of the tracking software according to the present invention.

Turning now to FIG. 4, installation of the tracking application of the present invention is illustratively shown. The installation may begin (Block 40) by optionally installing the local printer port monitoring program (Block 41) to determine whether a user computer 11a, 11b is printing locally or just to the network printer(s) 13. If local printing is detected, at Block 42, then the collection software may cause the tracking application to be installed on the appropriate user computer(s) 11a, 11b. This may be done by the methods discussed above, for example, as well as manually. Further, if the tracking application is only to be installed on the server 16', for example, this could also be done remotely by a consultant (Block 43) or as otherwise noted above, thus ending the installation process (Block 44).

Figure 5:
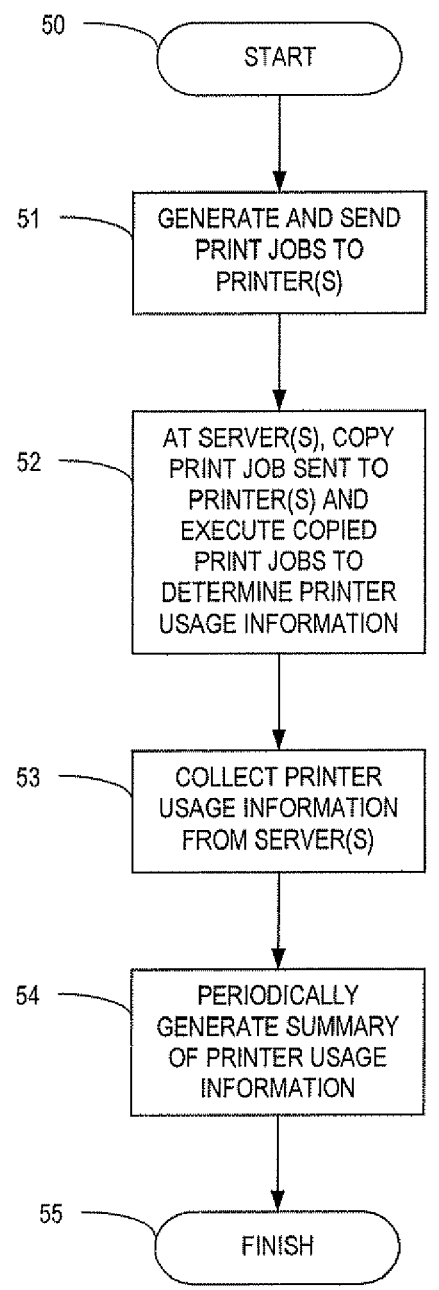
"FIGS. 5 and 6 are flow diagrams illustrating further operational aspects of the system of FIG. 2."
Figure 6:
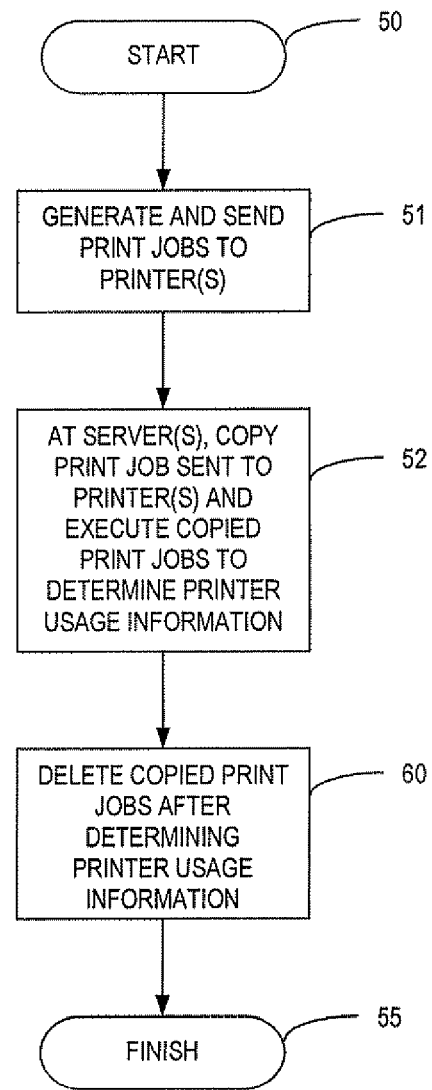

"Turning now to FIG. 5, beginning at Block 50, as the user computers 11' generate and send the print jobs to the printer 13' (Block 51), the server 16' copies the print jobs and executes the copied print jobs to determine printer usage information therefrom, at Block 52, as discussed further above. The collection computer 15' collects the printer usage information from the server 16', at Block 53, and also illustratively periodically generates a summary of the printer usage information, at Block 54, thus concluding the method illustrated in FIG. 5 (Block 55). As noted above, the copied printer control data may be deleted from the memory of the server 16' after the printer usage information has been generated, at Block 60 (FIG. 6)."

Many modifications and other embodiments of the invention will come to the mind of one skilled in the art having the benefit of the teachings presented in the foregoing descriptions and the associated drawings. Therefore, it is understood that the invention is not to be limited to the That which is claimed is:

1. A computer network comprising:
   at least one printer connected to the network for printing print jobs;
   a plurality of computers connected together in the network for generating and sending the print jobs to the at least one printer;
   at least one designated computer from among the plurality of computers generating printer usage information from the print jobs; and
   at least one of said plurality of computers comprising at least one server, and said at least one server causing a monitoring application to be installed on said at least one designated computer to detect local printing;
   said at least one server also causing a tracking application to be installed on said at least one designated computer for causing said at least one designated computer to generate the printer usage information based upon the monitoring application detecting the local printing.

2. The computer network of claim 1 wherein said at least one designated computer copies the print jobs and generates the printer usage information based upon the copied print jobs.

3. The computer network of claim 1 wherein said at least one designated computer comprises at least one designated server.

4. The computer network of claim 1 wherein said at least one server collects the printer usage information.

5. The computer network of claim 1 wherein said at least one designated computer comprises at least one of a personal computer (PC), a laptop, and a personal data assistant (PDA).

6. The computer network of claim 1 wherein said at least one designated computer is temporarily connected to the network.

7. The computer network of claim 1 wherein said at least one designated computer also generates the print jobs.

8. The computer network of claim 1 wherein at least one collection computer from among the plurality of computers collects the printer usage information from said at least one designated computer.

9. The computer network of claim 8 wherein said at least one collection computer causes a tracking application to be installed on said at least one designated computer for causing said at least one designated computer to generate the printer usage from the print jobs.

10. The computer network of claim 8 wherein said at least one collection computer periodically generates a summary of the printer usage information.

11. The computer network of claim 1 wherein said at least one designated computer also collects the printer usage information.

12. The computer network of claim 1 wherein the printer usage information comprises at least one of a date when each print job was sent, a time when each print job was sent, an identifier of a computer generating each print job, a user name of a user originating each print job, an identifier for said at least one printer, a number of pages to be printed, and a size of each print job.

13. The computer network of claim 1 wherein the printer usage information comprises job attributes comprising at least one of paper size, simplex printing, duplex printing, sorting, stapling, binding, color printing, document collation, tumble feeding, manual feeding, automatic feeding, and trim.

14. A computer network comprising:
    at least one printer connected to the network for printing print jobs;
    a plurality of user computers connected together in the network and generating and sending the print jobs to the at least one printer; and
    at least one server connected to said network for copying the print jobs sent to said at least one printer and executing the copied print jobs to determine printer usage information therefrom;
    said at least one server causing a monitoring application to be installed on at least one of said user computers to detect local printing, and causing a tracking application to be installed on said at least one user computer based upon the monitoring application detecting the local printing, the tracking application for causing said at least one user computer to copy print jobs originating therefrom and generate printer usage information for its respective print jobs;
    said at least one user computer tagging the print jobs originating therefrom, and wherein said at least one server does not determine printer usa e information for the tagged print jobs.

15. The computer network of claim 14 wherein said at least one user computer is temporarily connected to the network.

16. The computer network of claim 14 wherein said at least one server also collects the printer usage information.

17. The computer network of claim 14 wherein each user computer comprises at least one of a personal computer (PC), a laptop, and a personal data assistant (PDA).

18. The computer network of claim 14 wherein at least one of said user computers collects the printer usage information from said at least one server.

19. The computer network of claim 18 wherein said at least one user computer periodically, generates a summary of the printer usage information.

20. The computer network of claim 14 wherein said at least one server deletes the copied print jobs stored thereon after determining the printer usage information.

21. The computer network of claim 14 wherein the printer usage information comprises at least one of a date when each print job was sent, a time when each print job was sent, an identifier of a computer generating each print job, a user name of a user originating each print job, an identifier for said at least one printer, a number of pages to be printed, and a size of each print job.

22. The computer network of claim 14 wherein the printer usage information comprises job attributes comprising at least one of paper size, simplex printing, duplex printing, sorting, stapling, binding, color printing, document collation, tumble feeding, manual feeding, automatic feeding, and trim.

23. A method for generating printer usage information for a plurality of computers connected together in a computer network with at least one server, the method comprising:
    generating and sending print jobs from the plurality of computers to at least one printer connected to the computer network;
    copying the print jobs sent to the at least one printer to the at least one server from among the plurality of computers;
    executing the copied print jobs to determine printer usage information therefrom using the at least one server;

using the at least one server to cause a monitoring application to be installed on at least one designated computer to detect local printing; and using the at least one server to cause a tracking application to be installed on the at least one designated computer based upon the monitoring application detecting the local printing, the tracking application for causing the at least one designated computer to copy print jobs originating therefrom and generate printer usage information for its respective print jobs.

24. The method of claim 23 further comprising using the at least one server to collect the printer usage information.

25. The method of claim 23 wherein the at least one designated computer is temporarily connected to the network.

26. The method of claim 23 wherein generating the print jobs comprises generating at least some of the print jobs using the at least one designated computer.

27. The method of claim 23 further comprising periodically generating a summary of the printer usage information.

28. The method of claim 23 wherein the printer usage information comprises at least one of a date when each print job was sent, a time when each print job was sent, an identifier of a computer generating each print job, a user name of a user originating each print job, an identifier for the at least one printer, a number of pages to be printed, and a size of each print job.

29. The method of claim 23 wherein the printer usage information comprises job attributes comprising at least one of paper size, simplex printing, duplex printing, sorting, stapling, binding, color printing, document collation, tumble feeding, manual feeding, automatic feeding, and trim.

30. A computer-readable medium having stored computer-executable instructions for performing steps comprising:

generating and sending print jobs from a plurality of computers connected together in a computer network to at least one printer connected to the computer network;

copying the print jobs sent to the at least one printer to at least one server connected to the computer network;

executing the copied print jobs to determine printer usage information therefrom using the at least one server;

using the at least one server to cause a monitoring application to be installed on at least one designated computer to detect local printing; and using the at least one server to cause a tracking application to be installed on the at least one designated computer based upon the monitoring application detecting the local printing, the tracking application for causing the at least one designated computer to copy print jobs originating therefrom and generate printer usage information for its respective print jobs.

31. The computer-readable medium of claim 30 further having computer-executable instructions for performing a step of collecting the printer usage information from the at least one designated computer.

32. The computer-readable medium of claim 30 wherein the at least one designated computer is temporarily connected to the network.

33. The computer-readable medium of claim 30 further having computer-executable instructions for performing a step of periodically generating a summary of the printer usage information.

34. The computer-readable medium of claim 30 wherein the printer usage information comprises at least one of a date when each print job was sent, a time when each print job was sent, an identifier of a computer generating each print job, a user name of a user originating each print job, an identifier for the at least one printer, a number of pages to be printed, and a size of each print job.

35. The computer-readable medium of claim 30 wherein the printer usage information comprises job attributes comprising at least one of paper size, simplex printing, duplex printing, sorting, stapling, binding, color printing, document collation, tumble feeding, manual feeding, automatic feeding, and trim.

* * * * *

UNITED STATES PATENT AND TRADEMARK OFFICE
CERTIFICATE OF CORRECTION

PATENT NO. : 7,362,461 B2  Page 1 of 1
APPLICATION NO. : 10/470869
DATED : April 22, 2008
INVENTOR(S) : Reddy et al.

It is certified that error appears in the above-identified patent and that said Letters Patent is hereby corrected as shown below:

Column 10, Line 25        Delete: "usa e"
                          Insert: --usage--

Signed and Sealed this

Thirtieth Day of September, 2008

JON W. DUDAS
*Director of the United States Patent and Trademark Office*